(12) United States Patent
Fukushima et al.

(10) Patent No.: US 7,868,952 B2
(45) Date of Patent: Jan. 11, 2011

(54) PARALLAX BARRIER DEVICE, METHOD FOR FABRICATING THE SAME AND DISPLAY APPARATUS INCLUDING A PARALLAX BARRIER DEVICE

(75) Inventors: Hiroshi Fukushima, Nara (JP); Tomoo Takatani, Nara (JP); Masakazu Wada, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 859 days.

(21) Appl. No.: 10/530,861

(22) PCT Filed: Oct. 14, 2003

(86) PCT No.: PCT/JP03/13102

§ 371 (c)(1),
(2), (4) Date: Apr. 11, 2005

(87) PCT Pub. No.: WO2004/036287

PCT Pub. Date: Apr. 29, 2004

(65) Prior Publication Data

US 2006/0098281 A1    May 11, 2006

(30) Foreign Application Priority Data

Oct. 15, 2002   (JP)   ............... 2002-300030
Mar. 19, 2003   (JP)   ............... 2003-075446

(51) Int. Cl.
*G02F 1/1335* (2006.01)
*G02B 21/22* (2006.01)
*G02B 27/22* (2006.01)

(52) U.S. Cl. .................. 349/15; 349/201; 359/376; 359/462

(58) Field of Classification Search ............ 349/15, 349/201–202; 359/376, 462
See application file for complete search history.

(56) References Cited

U.S. PATENT DOCUMENTS

| | | | | |
|---|---|---|---|---|
| 4,729,640 A | * | 3/1988 | Sakata | 349/201 |
| 5,315,377 A | | 5/1994 | Isono et al. | 348/51 |
| 5,686,975 A | * | 11/1997 | Lipton | 349/15 |
| 5,825,436 A | * | 10/1998 | Knight | 349/16 |
| 5,831,765 A | * | 11/1998 | Nakayama et al. | 359/464 |

(Continued)

FOREIGN PATENT DOCUMENTS

JP    8-76110    3/1996

OTHER PUBLICATIONS

International Search Report of PCT/JP03/13102 mailed Nov. 18, 2003.

*Primary Examiner*—David Nelms
*Assistant Examiner*—Lauren Nguyen
(74) *Attorney, Agent, or Firm*—Nixon & Vanderhye P.C.

(57) ABSTRACT

A parallax barrier device includes a pair of transparent-electrode substrates each provided with a transparent electrode. A barrier light-shielding part and a light-transmitting part are formed in a gap between the pair of transparent-electrode substrates. A liquid crystal layer is formed in the barrier light-shielding part. A resin layer having the property of transmitting light is formed in the light-transmitting part. The barrier light-shielding part separates light for a first image viewed from a first direction and light for a second image viewed from a second direction different from the first direction. The light-transmitting part transmits the light for the first image and the light for the second image.

17 Claims, 9 Drawing Sheets

U.S. PATENT DOCUMENTS

| | | | |
|---|---|---|---|
| 6,020,941 A * | 2/2000 | Ma | 349/15 |
| 6,046,869 A | 4/2000 | Kaji | 360/1 |
| 6,157,424 A * | 12/2000 | Eichenlaub | 349/74 |
| 6,246,451 B1 * | 6/2001 | Matsumura et al. | 349/15 |
| 6,842,170 B1 * | 1/2005 | Akins et al. | 345/173 |
| 2004/0004687 A1 * | 1/2004 | Baek | 349/114 |

* cited by examiner

PARALLAX BARRIER DEVICE, METHOD FOR FABRICATING THE SAME AND DISPLAY APPARATUS INCLUDING A PARALLAX BARRIER DEVICE

This application is the US national phase of international application PCT/JP2003/013102 filed 14 Oct. 2003 which designated the U.S. and claims priority of JP 2002-300030, filed 15 Oct. 2002, and JP 2003-075446, filed 19 Mar. 2003, the entire contents of each of which are hereby incorporated by reference.

TECHNICAL FIELD

The present invention relates to a parallax barrier device for permitting different images or an identical image to be viewed from a plurality of view points without the need for special glasses and to a method for fabricating the device. The present invention also relates to a display apparatus including a parallax barrier device.

BACKGROUND ART

To display three-dimensional images without using glasses, various methods have been proposed to date. As one of such methods, a lenticular lens method is known. A lenticule is a segment including a large number of small lenses and is used to control the traveling direction of light such that a right-eye image reaches the right eye and a left-eye image reaches the left eye. However, in general, the lenticular lens method has the drawback of incapability of switching between a three-dimensional image and a two-dimensional image.

As another method for displaying a three-dimensional image, a parallax barrier method has been proposed. In this method, light-shielding slits in the shape of narrow strips called barrier strips are used. For example, a right-eye image in the form of strips and a left-eye image in the form of strips are alternately displayed at a distance from the rear of light-shielding slits so that these images are seen through the light-shielding slits in such a manner that the viewer's right eye sees only the right-eye image and the viewer's left eye sees only the left-eye image. In this manner, a stereoscopic image is seen without the need for glasses. In such a method, a light-shielding part serving as a barrier and a light-transmitting part are fixed. Accordingly, when a viewer sees a two-dimensional image, the light-shielding part becomes an obstacle, resulting in the problem that a bright two-dimensional image is not obtained.

In Japanese Patent Publication No. 5-122733, disclosed is a method in which a three-dimensional image is displayed on a liquid crystal display panel and a barrier strip image is electronically generated by using another liquid crystal display panel so that stereoscopic vision of the three-dimensional image is produced. According to this method, in the case of displaying a two-dimensional image, the barrier strip image is erased so that the barrier strip image does not act as an obstacle. In this manner, a bright and clear two-dimensional image is displayed and the display can be switched between a three-dimensional image and a two-dimensional image. In such a technique, the shape of a transparent electrode on a liquid crystal display panel for displaying a barrier strip image needs to be patterned according to the shape of barrier strips. In particular, the patterning of the transparent electrode needs to be performed by etching, for example. Accordingly, in forming a fine electrode pattern, there might arise a problem in which a break occurs in wiring and the yield decreases.

In Japanese Patent Publication No. 8-76110, disclosed is a method in which a liquid crystal panel and a patterned polarizer are combined to create barrier strips so that stereoscopic vision of an image is produced. FIG. 7 is a cross-sectional view schematically showing a three-dimensional image display apparatus disclosed in Japanese Patent Publication No. 8-76110. The three-dimensional image display apparatus disclosed in Japanese Patent Publication No. 8-76110 will be described with reference to FIG. 7.

A liquid crystal panel 10B for creating barrier strips is provided at the front of an image display means 20B including pixel parts 101 constituting a right-eye image and pixel parts 102 constituting a left-eye image. A liquid crystal layer 33 is sandwiched and held between substrates 31 and 32 made of, for example, glass. A polarizer 34 is provided between the lower substrate 32 and the image display means 20B.

A patterned polarizer 30B is provided on the upper face of the upper substrate 31. The polarizer 30B includes a polarizing film 50 made of polyvinyl alcohol (hereinafter, referred to as a "PVA film") divided into polarizing regions 51 having a polarizing function and non-polarizing regions 52 having no polarizing function. The PVA film 50 is sandwiched and held in a transparent supporter 60 made of, for example, triacetyl-cellulose (hereinafter, referred to as "TAC") or glass. In this manner, the patterned polarizer 30B is formed.

FIG. 8 is a cross-sectional view showing a principle of a three-dimensional image display by the three-dimensional image display apparatus disclosed in Japanese Patent Publication No. 8-76110. The principle of a three-dimensional image display will be described with reference to FIG. 8. The apparatus is set such that the polarization direction of the polarizer 34 is orthogonal to the polarization direction in the polarizing regions 51 of the polarizer 30B. When a voltage is applied to the liquid crystal panel 10B to make liquid crystal molecules in the liquid crystal layer 33 stand, the polarizing regions 51 serve as barriers. On the other hand, the non-polarizing regions 52 transmit light, irrespective of the polarization direction. In this manner, the polarizing regions 51 are configured to serve as a parallax barrier with respect to the pixel parts 101 and 102, so that a three-dimensional image is displayed by a parallax barrier method.

FIG. 9 is a cross-sectional view showing a principle of a two-dimensional display by the three-dimensional image display apparatus disclosed in Japanese Patent Publication No. 8-76110. The principle of a two-dimensional image display will be described with reference to FIG. 9. When no voltage is applied to the liquid crystal panel 10B, the polarizing regions 52 are in the state of permitting transmission of light. Accordingly, the polarizing regions 52 do not become barriers, so that light passes through the entire surface of the liquid crystal panel 10B. In this state, if an image displayed by the pixel parts 101 and 102 is set as a two-dimensional image, the two-dimensional image is observed.

With the technique disclosed in Japanese Patent Publication No. 8-76110, even if a fine barrier strip pattern is used, patterning of the polarizer 30B eliminates the necessity of etching of an electrode pattern. Accordingly, a complex barrier strip pattern is formed without occurrence of wiring failure, thus providing a stereoscopic image display apparatus capable of electrically switching display between a two-dimensional image and a three-dimensional image.

However, the polarizer 30B disclosed in Japanese Patent Publication No. 8-76110 has the following drawbacks in fabrication. A process of fabricating the polarizer 30B will be described. A stretched PVA film 50 is attached to a transparent supporter 60 made of, for example, glass or TAC, and then a resist film is formed on the PVA film 50. A part 52 which is not to be provided with a polarizing function is masked, and then an exposed part 51 of the PVA film 50 is colored with iodine or dichromatic dye for providing a polarizing function.

An organic macromolecule (resin) film, particularly the PVA film 50 used as a polarizing film, is susceptible to expansion and shrinkage by heat or moisture and greatly varies in size, as compared to inorganic materials such as glass. Accordingly, not only in a case where PVA is attached to a substrate of an organic macromolecule material such as TAC with an adhesive interposed therebetween but also in a case where PVA is attached to a glass substrate exhibiting a small size variation, size variation due to lateral shearing of an adhesive layer might occur.

In a case where a resist pattern is formed on a PVA film by photolithography, a process of peeling off a resist with a solvent such as a caustic soda aqueous solution or a heating process such as pre-baking of a resist is needed. Therefore, the finished size of an actual resist pattern readily changes as compared to the design size of a resist (barrier) pattern, so that a deviation from the design size of a barrier pattern occurs. In addition, the polarizer 30B in which a barrier strip pattern is formed, the liquid crystal panel 10B and the image display means 20B for displaying images for the left and right eyes need to be placed at predetermined positions with accuracy. Accordingly, a higher positioning accuracy is required as the pattern of barrier strips becomes finer.

If the PVA film 50 exhibiting a large size variation as described above is patterned, the finished size deviates from the design size because of the large size variation. Accordingly, the accuracy in the size of the barrier strip pattern decreases and, in addition, the matching accuracy between the barrier strip pattern and an image display pixel pattern also decreases. As a result, the problem of harmful effects on a 3D image display arises.

To color the PVA film 50 patterned using a resist with iodine or dichromatic dye, new processes which have never been used in conventional processes of fabricating liquid crystal display apparatuses need to be introduced. This causes another problem of complicated fabrication.

DISCLOSURE OF INVENTION

It is therefore an object of the present invention to provide a parallax barrier device in which a fine barrier pattern is formed with size accuracy by using conventional processes for fabricating a liquid crystal display apparatus and the barrier pattern is electrically switched between display and non-display.

A parallax barrier device according to the present invention includes a pair of transparent-electrode substrates each provided with a transparent electrode, wherein a barrier light-shielding part and a light-transmitting part are formed in a gap between the pair of transparent-electrode substrates, a liquid crystal layer is formed in the barrier light-shielding part, a resin layer having the property of transmitting light is formed in the light-transmitting part, the barrier light-shielding part separates light for a first image viewed from a first direction and light for a second image viewed from a second direction different from the first direction, and the light-transmitting part transmits the light for the first image and the light for the second image. The resin layer having the property of transmitting light typically has an approximately isotropic refractive index.

The parallax barrier device according to the present invention is divided into a region filled with a resin having the property of transmitting light and a region filled with a liquid crystal material having refractive-index isotropy. Polarized light which is linearly polarized by a polarizer and enters the region filled with the light-transmitting resin maintains its polarization state even after passing through the light-transmitting resin layer. This is because this resin layer typically has an approximately isotropic refractive index.

On the other hand, in the region filled with the liquid crystal material having refractive-index isotropy, polarized light entering the liquid crystal layer changes its polarization state in accordance with the orientation state of the liquid crystal layer. Accordingly, the polarization state is split according to the regions divided in the manner described above. A pair of polarizers sandwiching the pair of transparent-electrode substrates therebetween is oriented to have their axes appropriately disposed, thereby forming a light-transmitting part and a barrier light-shielding part.

In this description, the "first direction" and the "second direction" are both directions of line-of-sights of a viewer (viewers) and differ from each other. For example, the line-of-sight direction of the left eye of a viewer and the line-of-sight direction of the right eye of the viewer differ from each other and herein correspond to the "first direction" and the "second direction", respectively. Among a plurality of viewers, the line-of-sight direction of one of the viewers seeing a display screen from the right side and the line-of-sight direction of another viewer seeing the display screen from the left side, for example, herein correspond to the "first direction" and the "second direction", respectively.

The "first image viewed from the first direction" and the "second image viewed from the second direction" are herein defined as different images. Viewing different images has the following advantages. For example, a stereoscopic display utilizing binocular parallax is obtained by making an image seen by the left eye of a viewer and an image seen by the right eye of the viewer differ from each other, for example. In this case, the first image and the second image do not need to have mutual relation. For example, an image indicating traffic information and an image of television broadcasting, which are irrelevant to each other, may be displayed on a display screen of a car navigation system at the same time. Then, a driver in the driver's seat sees the image indicating traffic information and a passenger in the passenger's seat sees the image of television broadcasting at the same time.

In addition, "light for an image" includes not only light emitted from a pixel part of a display device but also light entering the pixel part of the display device and constituting an image.

The barrier light-shielding part and the light-transmitting part are preferably alternately arranged along a direction in a plane parallel to the pair of transparent-electrode substrates, and the width of the barrier light-shielding part in the direction in the plane is preferably larger than or equal to the width of the light-transmitting part in the direction in the plane.

The barrier light-shielding region has the function of separating light for the first image viewed from the first direction and light for the second image viewed from the second direction from each other so as to display the first image and the second image. For example, to display a stereoscopic image, the barrier light-shielding region has the function of separating light for a right-eye image and light for a left-eye image. However, if the barrier light-shielding part is narrower than the light-transmitting part, the image-light-splitting function of the barrier light-shielding region decreases. Accordingly, in the case of displaying a stereoscopic image, for example, a viewer sees an image with light for a right-eye image and light for a left-eye image mixed, resulting in that a double image (crosstalk) occurs and an excellent stereoscopic image can not be viewed in some cases.

The width (Lb) of the barrier light-shielding region and the width (La) of the light-transmitting part satisfy the relationship of La≦Lb, so that the barrier light-shielding region exhibits an excellent function of splitting light for images. Accordingly, it is possible to obtain an excellent stereoscopic image without a double image (crosstalk), for example.

The liquid crystal layer may be a liquid crystal layer exhibiting homogeneous alignment and containing a liquid crystal material whose dielectric-constant anisotropy $\Delta \in$ is positive, and may have a retardation of ½ of the wavelength of light entering the liquid crystal layer, $\lambda/2$ ($\lambda$=wavelength of incident light), under application of no voltage. Then, polarized light entering the liquid crystal layer has its polarization plane rotated according to the liquid crystal layer exhibiting homogeneous alignment, thus separating the directions of polarized light passing through the liquid crystal layer and polarized light passing through the light-transmitting resin from each other. Accordingly, if a pair of polarizers sandwiching the pair of transparent-electrode substrates is oriented to have their axes appropriately disposed, a light-transmitting part and a barrier light-shielding part are formed.

The liquid crystal layer may be a liquid crystal layer exhibiting homeotropic alignment and containing a liquid crystal material whose dielectric-constant anisotropy $\Delta \in$ is negative, and may have a retardation of ½ of the wavelength of light entering the liquid crystal layer, i.e., $\lambda/2$ ($\lambda$=wavelength of incident light), under application of a voltage. The liquid crystal layer exhibits homeotropic alignment and contains a liquid crystal material whose dielectric-constant anisotropy $\Delta \in$ is negative, so that application of a voltage to a transparent electrode of the parallax barrier device changes the alignment state into homogeneous alignment. The liquid crystal layer has a retardation ($\lambda/2$) under application of a voltage, so that the polarization plane is rotated, thereby separating the directions of polarized light passing through the liquid crystal layer and polarized light passing through the light-transmitting resin from each other. Accordingly, if a pair of polarizers sandwiching the pair of transparent-electrode substrates is oriented to have their axes appropriately disposed, a light-transmitting part and a barrier light-shielding part are formed.

The liquid crystal layer may be a liquid crystal layer exhibiting twisted nematic alignment. Then, polarized light entering the liquid crystal layer has its polarization plane rotated according to optical rotatory of the liquid crystal layer exhibiting TN alignment, so that the direction of polarized light passing through the liquid crystal layer and the direction of polarized light passing through the light-transmitting resin are made separated from each other. Accordingly, if a pair of polarizers sandwiching the pair of transparent-electrode substrates is disposed to have their axes appropriately disposed, a light-transmitting part and a barrier light-shielding part are formed.

The transparent electrode provided in each of the pair of transparent-electrode substrates is preferably a common electrode which is not patterned. The light-transmitting region and the barrier light-shielding region are formed of the light-transmitting resin layer and the liquid crystal layer, respectively, so that the transparent electrode does not need fine patterning. Accordingly, wiring failure is not caused by forming a transparent electrode pattern into, for example, a linear shape. As a result, it is possible to enhance the fabrication yield.

The parallax barrier device according to the present invention may further include a pair of polarizers sandwiching the pair of transparent-electrode substrates therebetween, wherein the directions of transmission easy axes of the pair of polarizers may be approximately parallel to each other. Since the transmission easy axis directions of the pair of polarizers are approximately parallel to each other, polarized light entering the light-transmitting resin layer from one of the polarizers passes through the other polarizer. That is, the region of the light-transmitting resin layer serves as a light-transmitting region. Polarized light entering the liquid crystal layer from one of the polarizers has its polarization state changed by retardation of the liquid crystal layer, so that this light is not likely to pass through the polarizer at the light-emitting side. That is, the region of the liquid crystal layer serves as a light-shielding region. In this manner, the light-transmitting region and the barrier light-shielding region are formed. The transmission easy axis will be hereinafter also simply referred to as a transmitting axis.

The parallax barrier device according to the present invention may further include: a pair of polarizers sandwiching the pair of transparent-electrode substrates therebetween; and an optical retardation plate (hereinafter, also referred to as $\lambda/2$ plate) having a retardation of ½ of the wavelength of incident light and placed in a gap between at least one of the pair of transparent-electrode substrates and at least one of the polarizers opposing said at least one of the pair of transparent-electrode substrates, wherein the directions of transmission easy axes of the pair of polarizers may be approximately orthogonal to each other.

Since the transmission easy axis directions of the pair of polarizers are approximately orthogonal to each other, placement of a $\lambda/2$ plate in such a manner that the polarizing plane is rotated by 90° makes polarized light passing through the light-transmitting resin layer pass through the polarizer at the light-emitting side. That is, the region of the light-transmitting resin layer serves as a light-transmitting region. On the other hand, if the liquid crystal layer has a retardation of $\lambda/2$ and at least one $\lambda/2$ plate is placed to be orthogonal to the orientation direction of the liquid crystal layer, polarized light passing through the liquid crystal layer has its polarization plates rotated by 0° or 180° by the $\lambda/2$ plate and the $\lambda/2$ retardation of the liquid crystal layer, so that polarization direction of incident light does not change. The transmission easy axis directions of the pair of polarizers are approximately orthogonal to each other, so that polarized light passing through the liquid crystal layer does not pass through the polarizer at the light-emitting side. That is, the region of the liquid crystal layer serves as a light-shielding region. Accordingly, a parallax barrier device having an excellent light-shielding function is obtained.

The light-transmitting resin layer preferably also functions as a spacer for maintaining a uniform space between the pair of transparent-electrode substrates. Then, a spacer and a barrier pattern are formed at the same time, thus simplifying the fabrication process.

A method for fabricating a parallax barrier device according to the present invention includes the steps of: applying a resin material having the property of transmitting light onto the transparent-electrode substrates; and performing, on the resin material, processes of exposure to light using a photo mask, development and baking, thereby forming the light-transmitting resin layer. The resin material having the property of transmitting light typically has an approximately isotropic refractive index.

With a method for fabricating a parallax barrier device according to the present invention, a resin layer with the property of transmitting light patterned in a stripe pattern or a matrix pattern is formed by photolithography. Accordingly, a fine barrier pattern is formed with accuracy in patterning size. In addition, a general photolithography process is used in the process of fabricating a liquid crystal display apparatus, so that new processes do not need to be introduced. As a result, fabrication is performed with ease.

A display apparatus according to the present invention includes: the parallax barrier device according to the present invention; and an image display device including a first pixel part constituting the first image and a second pixel part constituting the second image. If the image display device is not a self-emitting display device such as a liquid crystal display device, a light source is preferably further provided at a larger distance from a viewer than those from the parallax barrier device and the image display device. Examples of a light source include an area lit configuration backlight in which a lamp such as a cold-cathode fluorescent lamp is placed below a face of a parallax barrier device or an image display device and an edge lit configuration backlight in which a lamp is placed at a side face of a light guide plate.

In the display apparatus according to the present invention, the first pixel part may be a pixel part for a left eye, and the second pixel part may be a pixel part for a right eye. Then, a display device capable of switching between a stereoscopic display and a plane display is obtained.

The liquid crystal layer preferably switches display between a first display and a second display, e.g., a stereoscopic display (three-dimensional display) and a plane display (two-dimensional display), by switching the state of light between opaque and transmission in accordance with an electric signal applied to the pair of transparent electrodes.

Switching between a first display and a second display by switching the state of light between opaque and transmission will be described taking switching between a stereoscopic display and a plane display as an example. A gap between the pair of transparent electrodes is divided into a region filled with a resin having the property of transmitting light and a region filled with a liquid crystal material having refractive-index anisotropy. Light rays from a light source are linearly polarized by a polarizer. In a case where no voltage is applied to a parallax barrier device having a light-shielding function for forming a parallax barrier, light from a light source (polarized light) which is linearly polarized enters the region filled with the light-transmitting resin is emitted from the parallax barrier device with its polarized state maintained even after passing through the light-transmitting resin layer. This is because the light-transmitting resin layer typically has an approximately isotropic refractive index.

On the other hand, in the region filled with the liquid crystal material having refractive-index isotropy, the polarization state changes in accordance with the orientation state of the liquid crystal layer. Accordingly, the polarization state is separated according to the regions divided in the manner described above. If a polarizer is placed such that the direction of polarized light emitted from the light-transmitting region and the transmission axis of the polarizer coincide with each other, a light-transmitting part and a barrier light-shielding part are formed. In addition, if the resultant device is combined with an image display device having a left-eye pixel part and a right-eye pixel part, a stereoscopic image is displayed.

During display of a two-dimensional image using a parallax barrier device with a light-shielding function (i.e., during application of a voltage in the case of homogeneous or TN alignment and during application of no voltage in the case of homeotropic alignment), liquid crystal molecules filling the gap between the pair of transparent-electrode substrates stand, so that linearly-polarized light entering the parallax barrier device is not affected by the refractive-index anisotropy of the liquid crystal layer and is emitted from the parallax barrier device with its polarization state unchanged. That is, polarized light emitted from the region filled with the liquid crystal material and polarized light emitted from the region filled with the light-transmitting resin are in the same polarization state, so that polarized light emitted from both of the regions passes through the polarizer placed at the light-emitting side of the parallax barrier device. Accordingly, a parallax barrier disappears, thus displaying a bright and clear two-dimensional image.

In this manner, the barrier light-shielding region filled with the liquid crystal material is switched between opaque and transmission of light according to an electric signal applied to a transparent electrode. This allows a display apparatus to switch display between a three-dimensional image and a two-dimensional image.

A display apparatus according to the present invention is not only used as the above-described stereoscopic image display apparatus utilizing binocular parallax but also applicable to a display apparatus allowing viewers at left and right sides of a display screen to see different images. For example, in a case where a display apparatus according to the present invention is applied as a display apparatus for a car navigation system, a driver in the driver's seat and a passenger in the passenger's seat see different images when the light-shielding function of the parallax barrier device is valid whereas the driver and the passenger see the same image when the light-shielding function of the parallax barrier device is invalid.

BEST MODE FOR CARRYING OUT THE INVENTION

Hereinafter, embodiments of the present invention will be described with reference to the accompanying drawings, taking a stereoscopic image display apparatus as an example. A display apparatus according to the present invention is not limited to the following stereoscopic display apparatuses and may be a display apparatus for displaying different images to a plurality of viewers, for example. In this case, the arrangement pattern of a light-shielding part and a light-transmitting part of a parallax barrier device only needs to be defined such that light rays for the respective images are separated as images to be seen by the respective viewers spaced at a distance.

Embodiment 1

Figure 1:
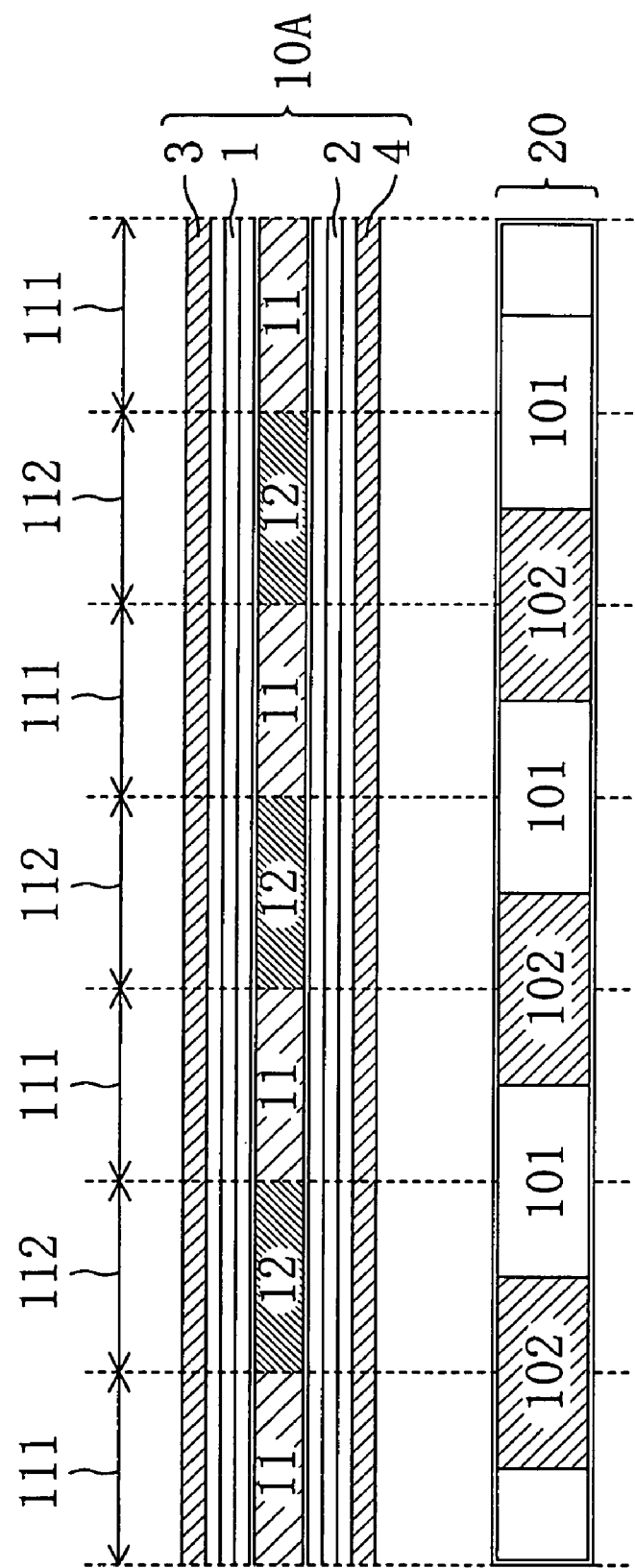
FIG. 1 is a cross-sectional view schematically showing a stereoscopic image display apparatus according to a first embodiment.

FIG. 1 is a cross-sectional view schematically showing a stereoscopic image display apparatus according to a first embodiment. The stereoscopic image display apparatus of this embodiment includes: a parallax barrier device 10A having a light-shielding function; an image display device 20 provided at the rear of the parallax barrier device 10A (at the side thereof opposite to a viewer: the same hereinafter); and a backlight (not shown) provided at the rear of the image display device 20. The image display device 20 includes: pixel parts 101 for displaying a right-eye image; and pixel parts 102 for displaying a left-eye image.

The parallax barrier device 10A includes: a pair of transparent-electrode substrates 1 and 2 made of glass or the like and provided with, for example, transparent electrodes; and a pair of polarizers 3 and 4 placed at the outsides of the pair of transparent-electrode substrates 1 and 2, respectively. The transparent-electrode substrates 1 and 2 include, on their opposed faces, alignment films (not shown) on each of which an alignment process has been performed in a given direction, Hereinafter, the parallax barrier device 10A will also be referred to as a liquid crystal panel.

The liquid crystal panel 10A includes: barrier light-shielding regions 111 for separating light from the pixel parts 101 for displaying a right-eye image and light from the pixel parts 102 for displaying a left-eye image from each other; and light-transmitting regions 112 for transmitting light from the pixel parts 101 for displaying the right-eye image and light from the pixel parts 102 for displaying the left-eye image. A liquid crystal layer 11 is formed in the barrier light-shielding regions 111 between the pair of transparent-electrode substrates 1 and 2.

A resin layer 12 having the property of transmitting light and having an approximately isotropic refractive index is formed in the light-transmitting regions 112 between the pair of transparent-electrode substrates 1 and 2. The light-transmitting resin layer 12 also serves as a spacer for maintaining a uniform space between the pair of transparent-electrode substrates 1 and 2.

In this case, the width (Lb) of each of the barrier light-shielding regions 111 and the width (La) of each of the light-transmitting regions 112 satisfy the relationship of La≦Lb. In this manner, an excellent stereoscopic image without crosstalk is obtained. This will be described in detail in later examples.

In this embodiment, the liquid crystal panel 10A is provided at the front of the image display device 20. However, in a display apparatus such as a liquid crystal display apparatus using a backlight as a light source, i.e., a display apparatus except for a self-emitting display apparatus such as an electroluminescence (EL) display apparatus, the positions of the liquid crystal panel 10A and the image display device 20 may be replaced with each other. For example, the image display device 20, the liquid crystal panel 10A and the backlight (light source) may be arranged in this order from a viewer.

Now, a principle of display by the stereoscopic image display apparatus of this embodiment will be described with reference to FIGS. 2 and 3. In this embodiment, a case where the liquid crystal layer 11 contains a liquid crystal material whose dielectric-constant anisotropy is positive and exhibits homogeneous alignment and the retardation is $\lambda/2$ when no voltage is applied will be described.

Figure 2:
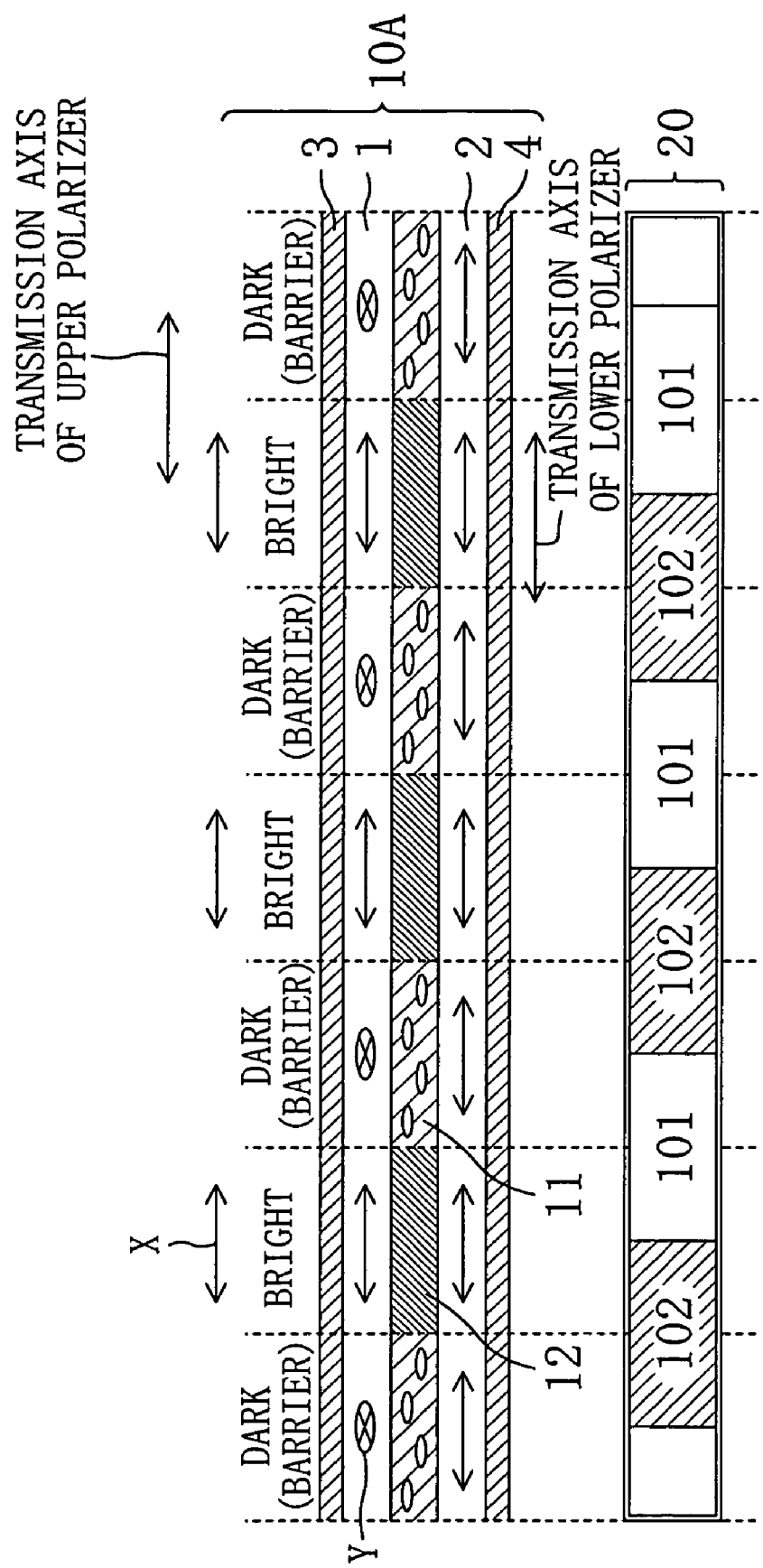
FIG. 2 is a cross-sectional view showing a principle of a three-dimensional image display by the stereoscopic image display apparatus of the first embodiment.

FIG. 2 is a cross-sectional view showing a principle of a three-dimensional image display by the stereoscopic image display apparatus of this embodiment. A principle of display when no voltage is applied to the liquid crystal panel 10A functioning as a parallax barrier device, i.e., when a three-dimensional image display is produced, will be described with reference to FIG. 2. The directions of the transmission axes of the respective polarizers 3 and 4 are set approximately in parallel with each other. The alignment direction of the liquid crystal layer 11 is preferably set at an angle of 45° with respect to the transmission axis directions of the polarizers 3 and 4. In FIG. 2, symbols X and Y respectively represent directions of polarization planes, and the respective polarization planes are approximately orthogonal to each other.

First, light passing through the liquid crystal layer 11 will be described. When light which is linearly polarized by the lower polarizer 4 enters the liquid crystal layer 11, the polarization direction of the light is turned by 90° because of retardation ($\lambda/2$) of the liquid crystal layer 11. Since the directions of the transmission axes of the pair of polarizers 3 and 4 are set approximately in parallel with each other, the linearly polarized light that has passed through the liquid crystal layer 11 cannot pass through the upper polarizer 3. Accordingly, the barrier light-shielding region 111 where the liquid crystal layer 11 is formed produces a dark display, thus forming a parallax barrier.

Next, light passing through the light-transmitting resin layer 12 will be described. Light which has been linearly polarized by the lower polarizer 4 and has passed through the light-transmitting resin layer 12 enters the upper polarizer 3 at the light-emitting side with its polarization state unchanged. This is because the light-transmitting resin layer 12 hardly has refractive-index anisotropy. Since the directions of the transmission axes of the respective upper and lower polarizers 3 and 4 are set approximately in parallel with each other, the light emitted from the light-transmitting resin layer 12 passes through the upper polarizer 3. Accordingly, the light-transmitting region 112 where the light-transmitting resin layer 12 is formed produces a bright display. In this manner, a right-eye image and a left-eye image are separately displayed. Accordingly, under application of no voltage to the liquid crystal panel 10A for splitting polarized light, the barrier light-shielding region 111 forms a parallax barrier, so that a three-dimensional image is displayed.

Figure 3:
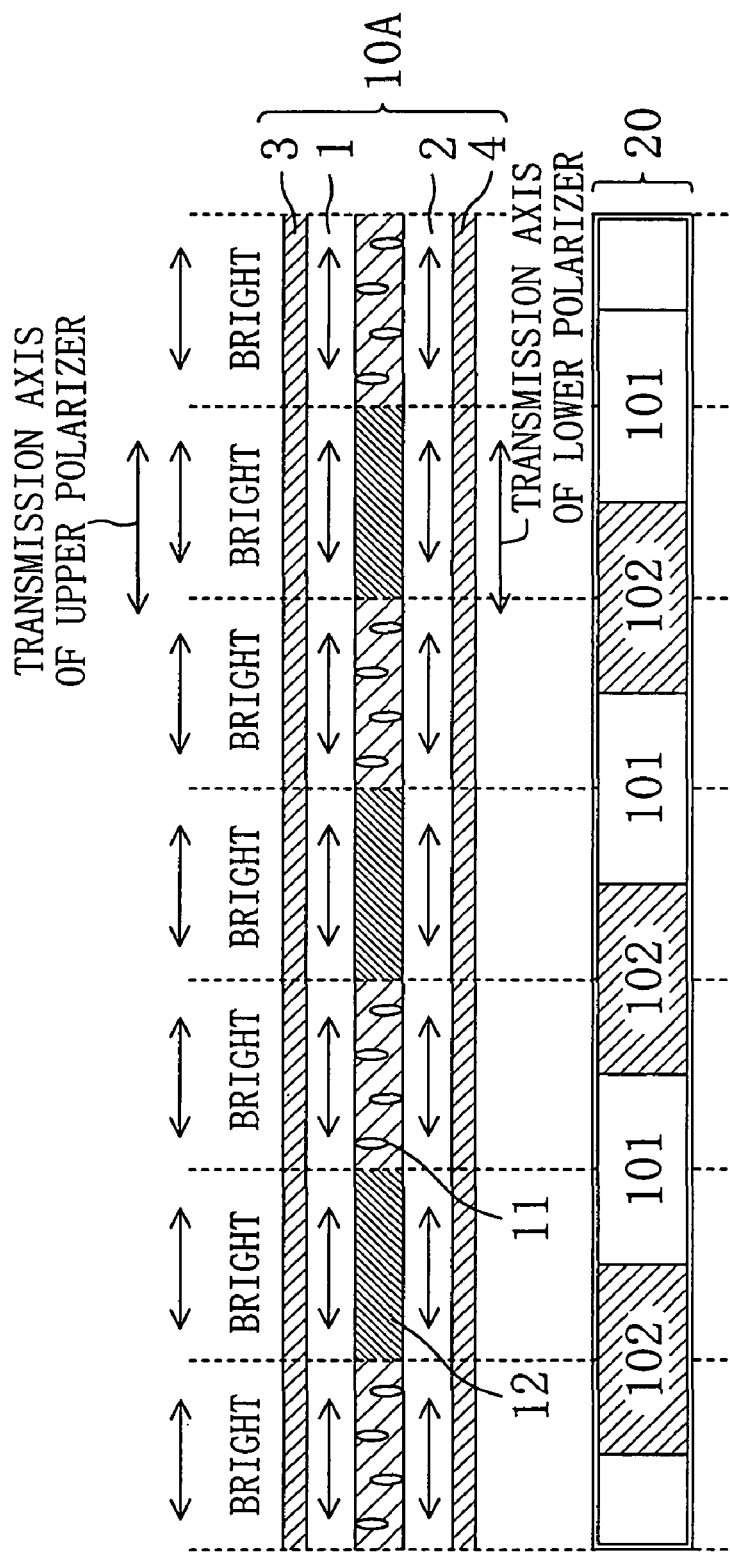
FIG. 3 is a cross-sectional view showing a principle of a two-dimensional image display by the stereoscopic image display apparatus of the first embodiment.

FIG. 3 is a cross-sectional view showing a principle of a two-dimensional image display by the stereoscopic image display apparatus of this embodiment. A principle of display when a voltage is applied to the liquid crystal panel 10A for splitting polarized light, i.e., when a two-dimensional image display is produced, will be described with reference to FIG. 3.

First, light passing through the liquid crystal layer 11 will be described. Under application of a voltage, liquid crystal molecules in the liquid crystal layer 11 are oriented in the normal direction to the electrodes. Accordingly, linearly polarized light entering the liquid crystal layer 11 is not affected by the liquid crystal layer 11 and enters the upper polarizer 3 with its polarization state maintained. The linearly polarized light entering the liquid crystal layer 11 passes through the upper polarizer 3, so that the barrier light-shielding region 111 where the liquid crystal layer 11 is formed is in a bright state.

As in the case of the three-dimensional image display, light which has passed through the light-transmitting resin layer 12 passes through the upper polarizer 3, so that the light-transmitting region 112 where the light-transmitting resin layer 12 is formed is in a bright state. Accordingly, under application of a voltage to the liquid crystal panel 10A functioning as a parallax barrier, the parallax barrier electrically disappears and the barrier light-shielding region 111 where the liquid crystal layer 11 is formed and the light-transmitting region 112 where the light-transmitting resin layer 12 is formed are both in bright states. As a result, a bright two-dimensional image is displayed.

Embodiment 2

In the first embodiment, the pair of polarizers 3 and 4 is used. However, an optical retardation plate such as a λ/4 plate or a λ/2 plate and a polarizer may be used in combination, as necessary. In a second embodiment, a principle of display by a stereoscopic image display apparatus using a λ/2 plate as an optical retardation plate will be described. As in the first embodiment, a liquid crystal layer 11 of this embodiment is a liquid crystal layer exhibiting homogeneous alignment and containing a liquid crystal material whose dielectric-constant anisotropy is positive and has a retardation of λ/2 when no voltage is applied.

Figure 4:
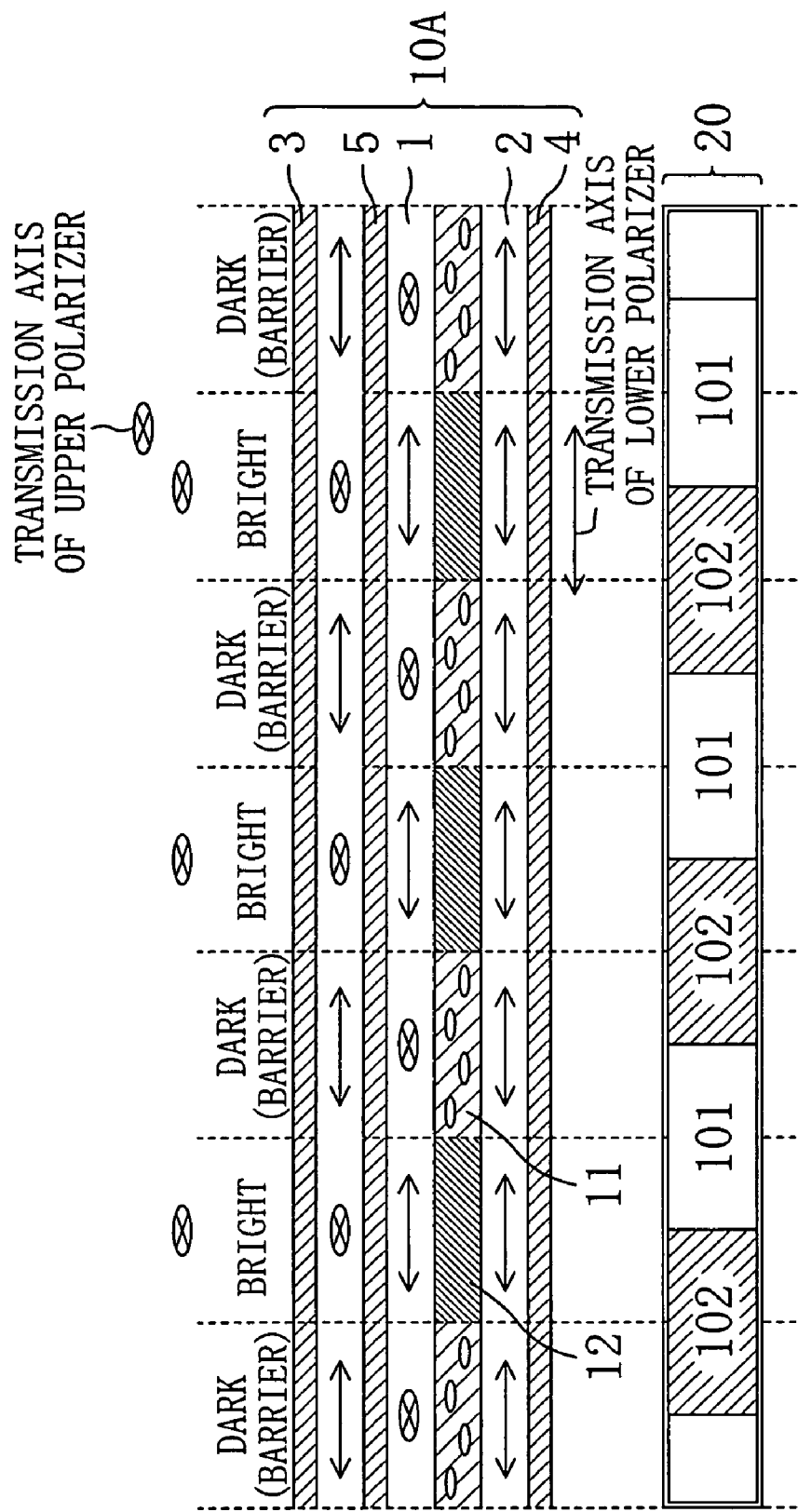
FIG. 4 is a cross-sectional view showing a principle of a three-dimensional image display by the stereoscopic image display apparatus according to a second embodiment.

FIG. 4 is a cross-sectional view showing a principle of a three-dimensional image display by a stereoscopic image display apparatus according to this embodiment. A principle of display when no voltage is applied to a liquid crystal panel 10A functioning as a parallax barrier device, i.e., when a three-dimensional display is produced, will be described with reference to FIG. 4.

The stereoscopic image display apparatus of this embodiment includes: an upper transparent-electrode substrate 1; and a λ/2 plate 5 provided in a gap between the transparent-electrode substrate 1 and an upper polarizer 3 opposed to the transparent-electrode substrate 1. The directions of the transmission axes of a pair of polarizers 3 and 4 are set approximately orthogonal to each other. The direction of alignment in the liquid crystal layer 11 is preferably set at 45° with respect to the direction of the transmission axis of the lower polarizer 4.

First, light passing through the liquid crystal layer 11 will be described. When light linearly polarized by the lower polarizer 4 enters the liquid crystal layer 11, the polarization direction of the light is turned by 90° because of retardation (λ/2) of the liquid crystal layer 11. The polarized light emitted from the liquid crystal layer 11 is turned by −90° again by the λ/2 plate 5 provided at the light-emitting side and is returned to the original polarization state. Since the directions of the respective transmission axes of the pair of polarizers 3 and 4 are set approximately orthogonal to each other, the linearly polarized light that has passed through the liquid crystal layer 11 cannot pass through the upper polarizer 3. Accordingly, the barrier light-shielding region 111 where the liquid crystal layer 11 is formed produces a dark display, thus forming a parallax barrier.

Next, light passing through the light-transmitting resin layer 12 will be described. Light which has been linearly polarized by the lower polarizer 4 and has passed through the light-transmitting resin layer 12 enters the λ/2 plate 5 with its polarization state unchanged. This is because the light-transmitting resin layer 12 hardly has refractive-index anisotropy. This polarized light enters the upper polarizer 3 with its polarization plane rotated by 90° according to the λ/2 plate 5. In other words, the polarized light enters the upper polarizer 3 with its polarization plane rotated by 90° with respect to the direction of the transmission axis of the lower polarizer 4. The direction of the transmission axis of the upper polarizer 3 is approximately orthogonal to that of the lower polarizer 4, so that light entering the upper polarizer 3 passes through the upper polarizer 3. Accordingly, the light-transmitting region 112 where the light-transmitting resin layer 12 is formed produces a bright display. In this manner, a right-eye image and a left-eye image are separately displayed. Accordingly, under application of no voltage to the liquid crystal panel 10A for splitting polarized light, the barrier light-shielding region 111 forms a parallax barrier, so that a three-dimensional image is displayed.

Figure 5:
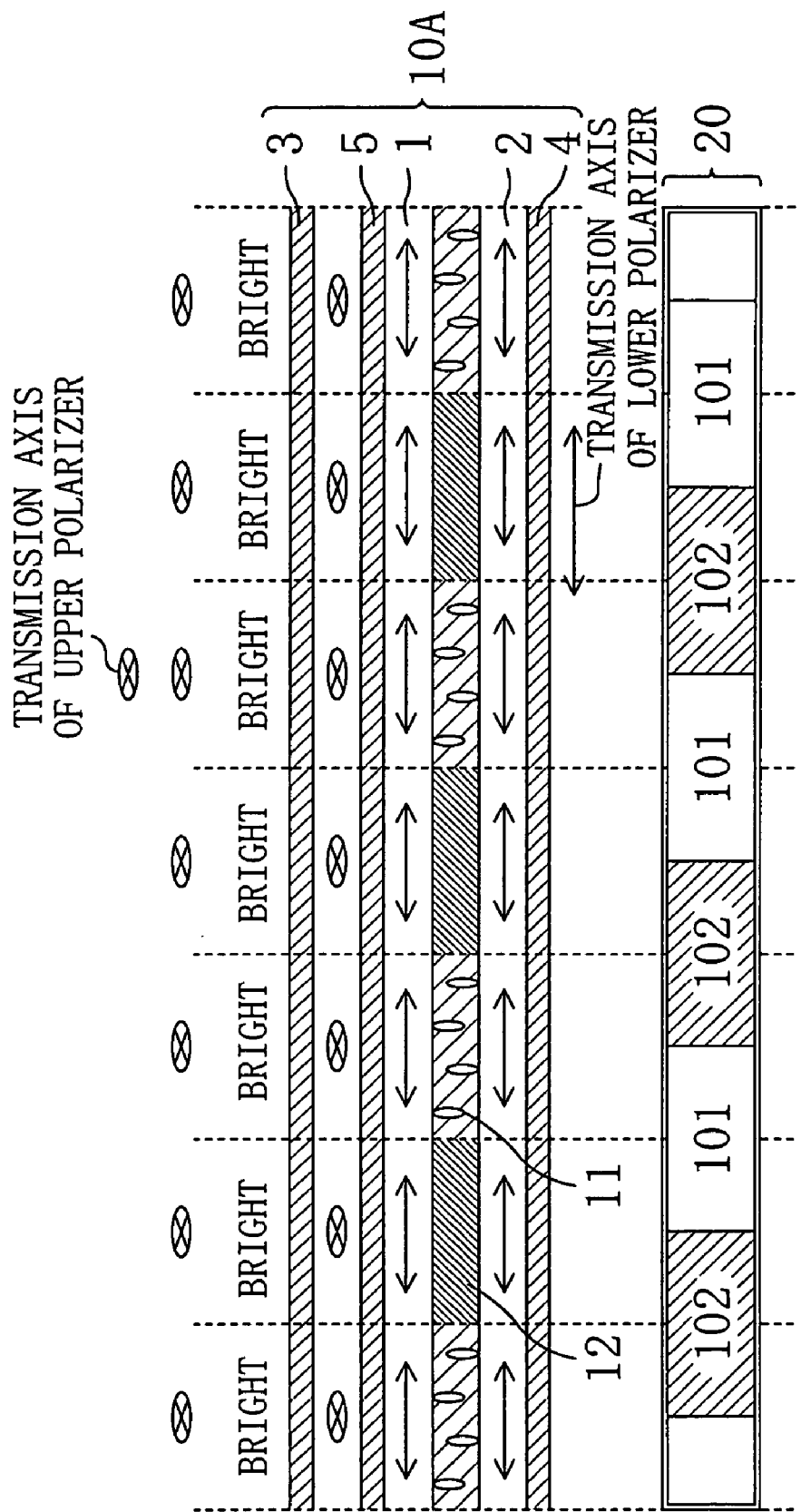
FIG. 5 is a cross-sectional view showing a principle of a two-dimensional image display by the stereoscopic image display apparatus of the second embodiment.

FIG. 5 is a cross-sectional view showing a principle of a two-dimensional image display by the stereoscopic image display apparatus of this embodiment. A principle of display when a voltage is applied to the liquid crystal panel 10A for splitting polarized light, i.e., when a two-dimensional image display is produced, will be described with reference to FIG. 5.

First, light passing through the liquid crystal layer 11 will be described. Under application of a voltage, liquid crystal molecules in the liquid crystal layer 11 stand in the normal direction to the electrodes. Accordingly, linearly polarized light entering the liquid crystal layer 11 is not affected by the liquid crystal layer 11 and enters the λ/2 plate 5 with its polarization state unchanged. This polarized light enters the upper polarizer 3 with its polarization plane rotated by 90° according to the λ/2 plate 5. Since the directions of the transmission axes of the pair of polarizers 3 and 4 are set approximately orthogonal to each other, linearly polarized light that has passed through the liquid crystal layer 11 passes through the upper polarizer 3. Accordingly, the barrier light-shielding region 111 where the liquid crystal layer 11 is formed is in a bright state.

As in the case of the three-dimensional image display, light which has passed through the light-transmitting resin layer 12 passes through the upper polarizer 3, so that the light-transmitting region 112 where the light-transmitting resin layer 12 is formed is in a bright state. Accordingly, under application of a voltage to the liquid crystal panel 10A functioning as a parallax barrier, the parallax barrier electrically disappears and the barrier light-shielding region 111 where the liquid crystal layer 11 is formed and the light-transmitting region 112 where the light-transmitting resin layer 12 is formed are both in bright states. As a result, a bright two-dimensional image is displayed.

As described in the first and second embodiments, a parallax barrier is formed by applying no voltage to the region (barrier light-shielding region) 111 where the liquid crystal layer 11 of the liquid crystal panel 10A is formed. Accordingly, if an image display device 20 is set to display a three-dimensional display image including a right-eye image and a left-eye image and a parallax barrier is formed in the liquid crystal panel 10A, a three-dimensional image is observed. In a case where the image display device 20 displays an image for a two-dimensional display, a voltage is applied to the liquid crystal panel 10A used as a parallax barrier device to make a parallax barrier disappear, thereby displaying a two-dimensional image. Accordingly, the stereoscopic image display apparatus according to the first and second embodiments enables easy switching between a two-dimensional image and a three-dimensional image.

Embodiment 3

In the first and second embodiments, the liquid crystal layer 11 exhibiting homogeneous alignment and containing a liquid crystal material whose dielectric-constant anisotropy is positive is used. In this embodiment, the liquid crystal layer 11 used in the first and second embodiments is replaced with a liquid crystal layer exhibiting homeotropic alignment and containing a liquid crystal material whose dielectric-constant anisotropy is negative. This liquid crystal layer exhibiting homeotropic alignment has a retardation of $\lambda/2$ during application of a voltage.

As compared to the liquid crystal layer 11 exhibiting homogeneous alignment containing a liquid crystal material whose dielectric-constant anisotropy is positive, the liquid crystal layer 11 exhibiting homeotropic alignment and containing a liquid crystal material whose dielectric-constant anisotropy $\Delta\in$ is negative makes its alignment state exactly reversed between application of no voltage and application of a voltage. Specifically, during application of no voltage, the liquid crystal layer 11 exhibits homeotropic alignment as shown in FIGS. 3 and 5. Since the liquid crystal layer 11 has no retardation, light which has passed through the liquid crystal layer 11 and light which has passed through the light-transmitting resin layer 12 both pass through the upper polarizer 3. As a result, the barrier light-shielding region 111 where the liquid crystal layer 11 is formed and the light-transmitting region 112 where the light-transmitting resin layer 12 is formed are both in bright states.

On the other hand, during application of a voltage, the liquid crystal layer 11 exhibits homogeneous alignment as shown in FIGS. 2 and 4 because of the negative dielectric-constant anisotropy thereof. Since the retardation of the liquid crystal layer 11 during application of a voltage is set at $\lambda 2$, the polarization plane of polarized light entering the liquid crystal layer 11 is rotated by 90°. In this case, as already described in the first and second embodiments, linearly polarized light which has passed through the liquid crystal layer 11 cannot pass through the upper polarizer 3, so that the barrier light-shielding region 111 produces a dark display.

Accordingly, in the case of using the liquid crystal layer 11 exhibiting homeotropic alignment and containing a liquid crystal material whose dielectric-constant anisotropy $\Delta\in$ is negative, a two-dimensional image display is produced during application of no voltage and a three-dimensional image display is produced during application of a voltage.

As described in the first through third embodiments, properties of the liquid crystal layer 11 are appropriately selected, e.g., the polarity (positive or negative) of dielectric-constant anisotropy and alignment state (homogeneous or homeotropic) is appropriately selected, so that a two-dimensional image display or a three-dimensional image display is selected as intended by utilizing the states of application of no voltage and application of a voltage.

Embodiment 4

In the following embodiment, a stereoscopic image display apparatus using a twisted nematic (TN) alignment liquid crystal layer 11 will be described.

Figure 6:
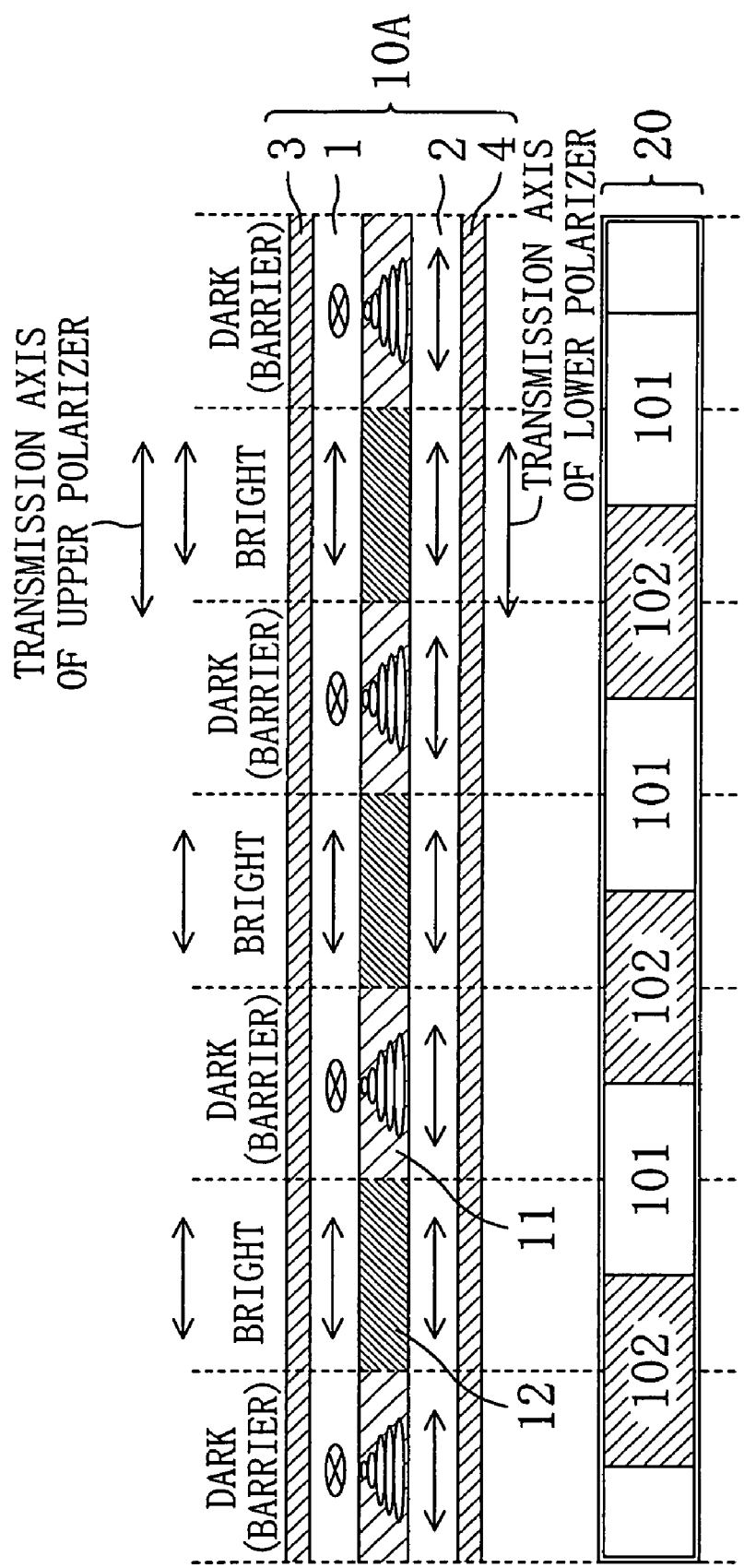
FIG. 6 is a cross-sectional view showing a principle of a three-dimensional image display by the stereoscopic image display apparatus according to a fourth embodiment.
Figure 7:
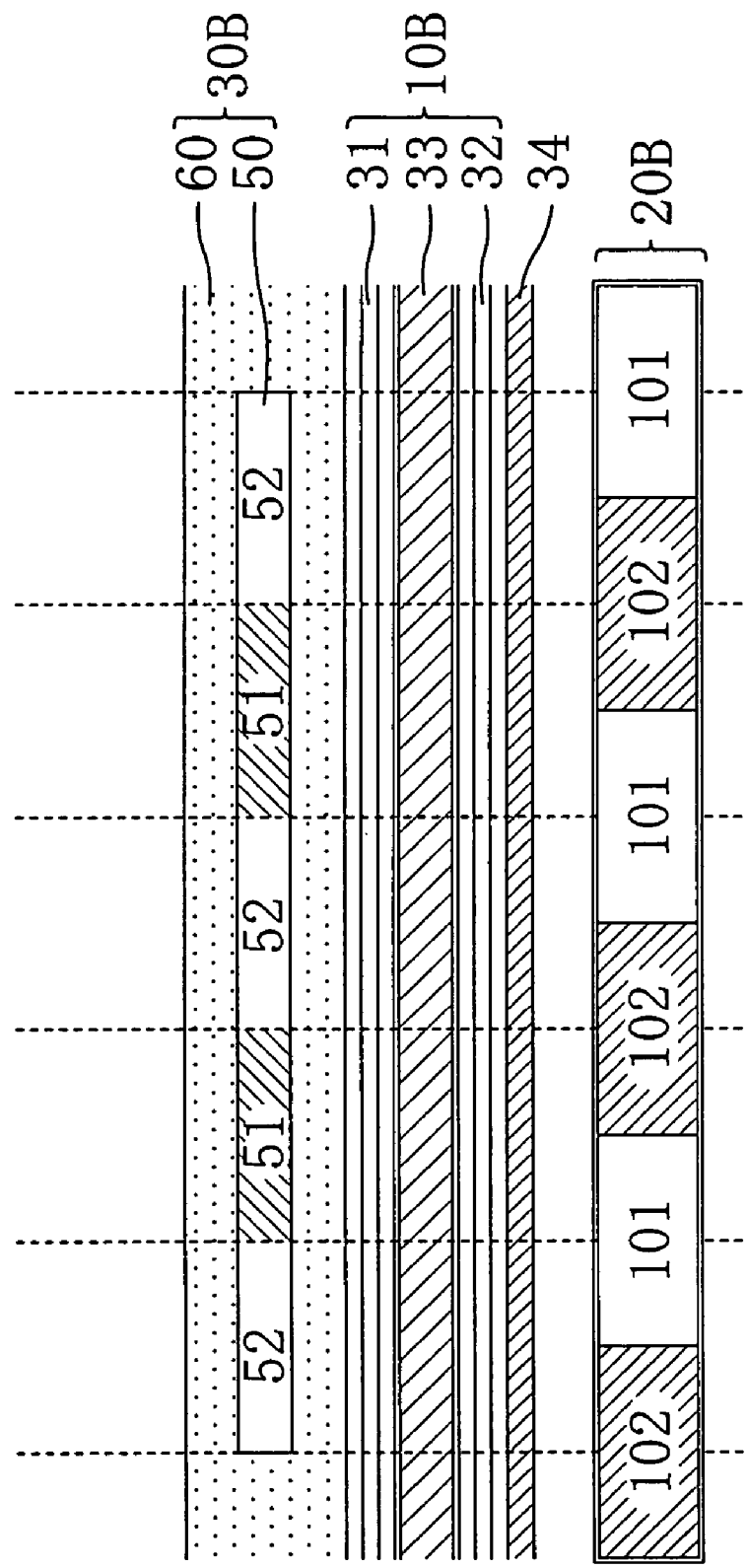
FIG. 7 is a cross-sectional view schematically showing a three-dimensional image display apparatus disclosed in Japanese Patent Publication No. 8-76110.
Figure 8:
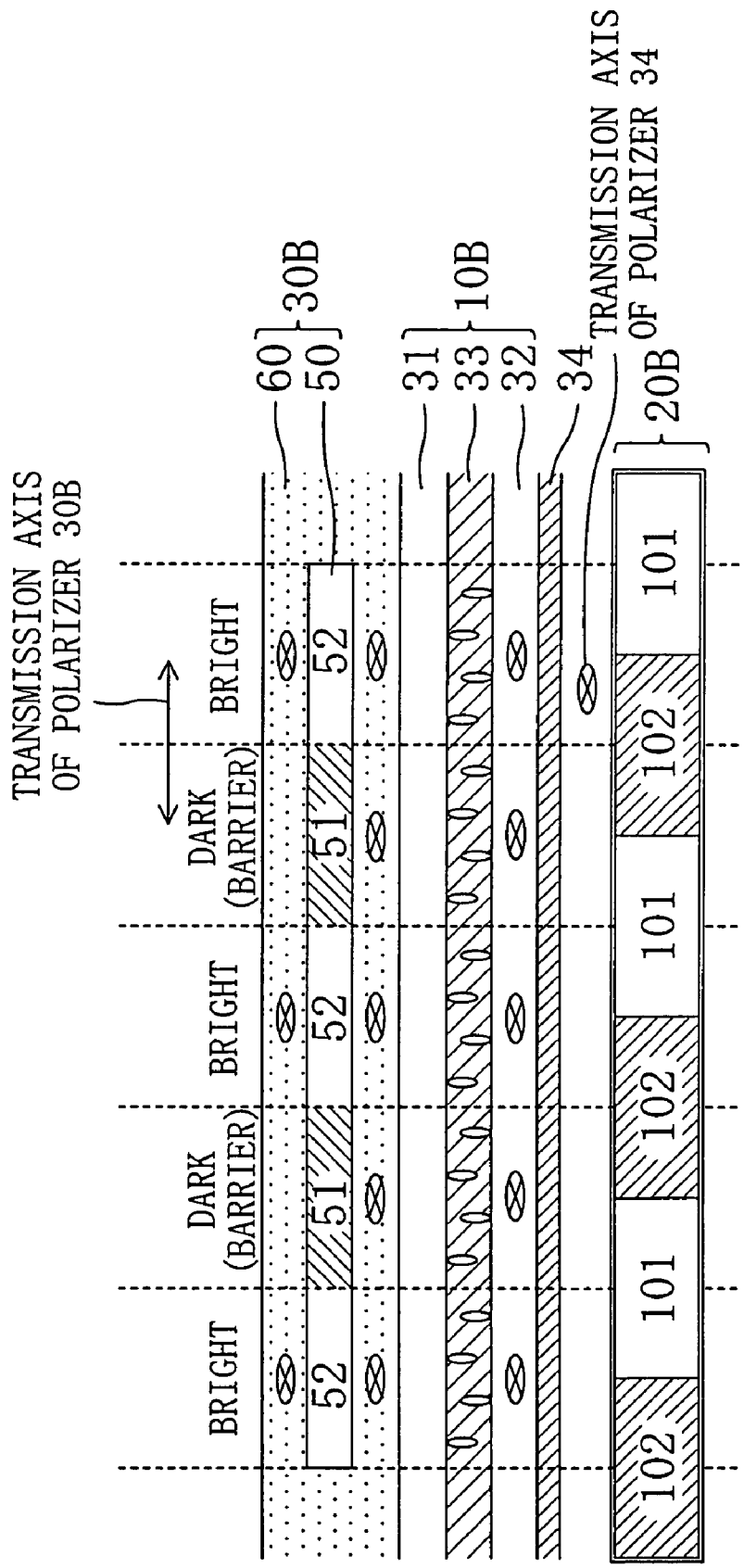
FIG. 8 is a cross-sectional view showing a principle of a three-dimensional image display by the three-dimensional image display apparatus disclosed in Japanese Patent Publication No. 8-76110.
Figure 9:
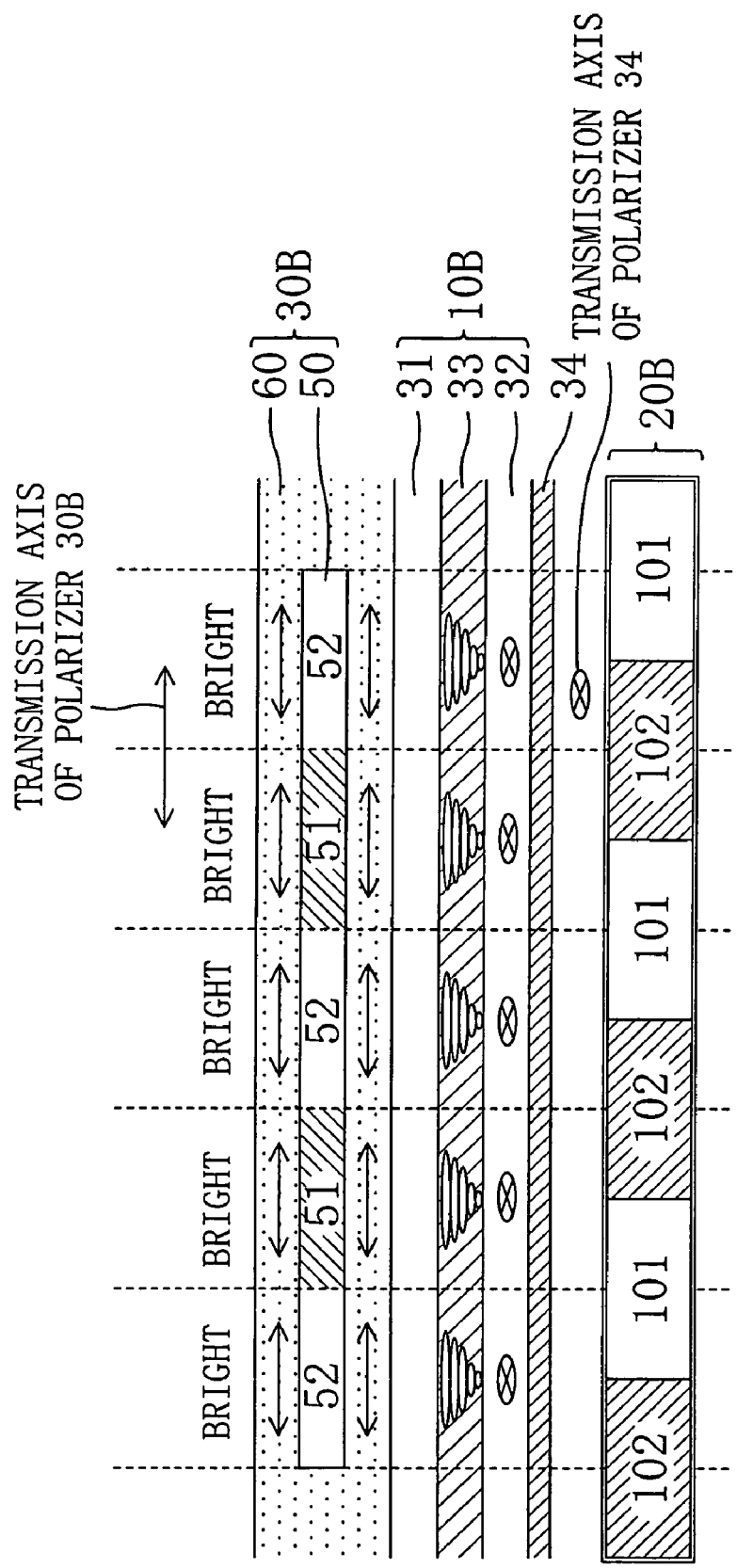
FIG. 9 is a cross-sectional view showing a principle of a two-dimensional image display by the three-dimensional image display apparatus disclosed in Japanese Patent Publication No. 8-76110.

FIG. 6 is a cross-sectional view showing a principle of a three-dimensional image display by a stereoscopic image display apparatus according to a fourth embodiment. A principle of display when no voltage is applied to a liquid crystal panel 10A functioning as a parallax barrier device, i.e., when a three-dimensional image display is produced, will be described with reference to FIG. 6. The stereoscopic image display apparatus of this embodiment has the same structure as that of the first embodiment except for that the liquid crystal layer 11 is a TN-alignment liquid crystal layer. For example, the directions of the transmission axes of respective polarizers 3 and 4 are set approximately in parallel with each other. However, alignment films respectively formed on a pair of substrates 1 and 2 have been subjected to alignment processes performed in directions approximately orthogonal to each other. In other words, these alignment films are formed to form TN alignment.

First, light passing through the liquid crystal layer 11 will be described. When light linearly polarized by the lower polarizer 4 enters the liquid crystal layer 11, the direction of the polarized light is turned by 90° because of the TN alignment in the liquid crystal layer 11. Since the directions of the respective transmission axes of the pair of polarizers 3 and 4 are set approximately in parallel with each other, the linearly polarized light that has passed through the liquid crystal layer 11 cannot pass through the upper polarizer 3. Accordingly, a barrier light-shielding region 111 where the liquid crystal layer 11 is formed produces a dark display, thus forming a parallax barrier.

As in the first embodiment, light which has passed through a light-transmitting resin layer 12 passes through the upper polarizer 3, so that a light-transmitting region 112 where the light-transmitting resin layer 12 is formed is in a bright state. Accordingly, under application of no voltage to the liquid crystal panel 10A functioning as a parallax barrier, the barrier light-shielding region 111 forms a parallax barrier, thereby displaying a three-dimensional image.

As in the first embodiment, under application of a voltage to the liquid crystal panel 10A, liquid crystal molecules in the liquid crystal layer 11 stand in the normal direction to the electrodes, so that the barrier light-shielding region 111 where the liquid crystal layer 11 is formed is in a bright state (see FIG. 3.) As in the case of the three-dimensional image display, light which has passed through the light-transmitting resin layer 12 passes through the upper polarizer 3, so that the light-transmitting region 112 where the light-transmitting resin layer 12 is formed is in a bright state. Accordingly, under application of a voltage to the liquid crystal panel 10A functioning as a parallax barrier, the parallax barrier electrically disappears and the barrier light-shielding region 111 where the liquid crystal layer 11 is formed and the light-transmitting region 112 where the light-transmitting resin layer 12 is formed are both in bright states. As a result, a bright two-dimensional image is displayed.

As described above, a parallax barrier is formed by applying no voltage (in the case of homogeneous or TN alignment) or applying a voltage (in the case of homeotropic alignment) to a region (barrier light-shielding region) 111 where the liquid crystal layer 11 of the liquid crystal panel 10A is formed when necessary. Accordingly, if an image display device 20 is set to display a three-dimensional display image including a right-eye image and a left-eye image and a parallax barrier is formed in the liquid crystal panel 10A, a three-dimensional image is displayed.

In a case where the image display device 20 displays an image for a two-dimensional display, a voltage is applied (in the case of homogeneous or TN alignment) or no voltage is applied (in the case of homeotropic alignment) to the liquid crystal panel 10A used as a parallax barrier device to make a parallax barrier disappear, thereby displaying a two-dimensional image. Accordingly, the stereoscopic image display apparatus according to the present invention enables easy switching between a two-dimensional image and a three-dimensional image.

If the liquid crystal panel 10A described in the first through fourth embodiments is combined with the image display device 20 including pixel parts 101 for displaying a right-eye image and pixel parts 102 for displaying a left-eye image, a stereoscopic image display apparatus allowing electrical switching between a two-dimensional image and a three-dimensional image is obtained. As the image display device 20, a flat panel display such as a liquid crystal panel, an organic or inorganic EL display panel, a plasma display panel (PDP) or a vacuum fluorescent display may be used. Pixel arrangement in the image display device 20 is not limited to a stripe arrangement, and may be a delta arrangement, a mosaic arrangement, a square arrangement or other arrangements. As the image display device 20, a black-and-white display panel or a full-color display panel may be used.

In the parallax barrier device according to the present invention, the liquid crystal layer may have a memory function. For example, if the liquid crystal layer 11 is made of a ferroelectric liquid crystal material, it is sufficient to make current flow through the liquid crystal panel 10A as a parallax barrier device only during switching between two-dimension and three-dimension. This enables reduction of power consumption.

In the three-dimensional image display apparatus disclosed in Japanese Patent Publication No. 8-76110, the PVA film 50 is formed on the entire surfaces of the transparent supporters 60 and 61. Accordingly, if the PVA film 50 shrinks by heat, the transparent supporters 60 and 61 are likely to shrink. However, the parallax barrier device according to the present invention has a stripe barrier pattern or the like, so that it is possible to form the light-transmitting resin layer 12 into a stripe pattern. Accordingly, even if the light-transmitting resin layer 12 shrinks by heat, an influence on the substrates 1 and 2 due to thermal shrinkage of the light-transmitting resin layer 12 is smaller than in the case where the light-transmitting resin layer 12 is formed on the entire surface.

Embodiment 5

A method for fabricating a liquid crystal panel 10A for splitting polarized light for use in a stereoscopic image display apparatus according to the present invention will be described. First, a transparent electrode (not shown) made of, for example, indium tin oxide (ITO) is formed on a lower substrate 2. The following description is given on the lower substrate 2 as an example for convenience. However, an upper substrate 1 is formed in the same manner as the lower substrate 2.

The transparent electrode may be formed by patterning, a common electrode which has not been patterned is preferably used for fabrication. A widely-available substrate provided with ITO may also be used. A photosensitive acrylic-based resin material of a negative resist type, for example, is applied as a transparent resin onto the substrate 2 provided with ITO by a spin coating method or another method. After light exposure using a photo mask, development is performed with, for example, a NaOH aqueous solution, and then a baking process is performed, thereby forming a light-transmitting resin layer 12 having a function of a spacer. Since the light-transmitting resin layer 12 functions also as a spacer, additional spacers do not need to be formed or distributed, thus simplifying fabrication processes.

After the formation of the light-transmitting resin layer 12 functioning as a spacer, the lower substrate 2 is coated with an alignment film (not shown) of, for example, polyamic acid by a print method and then is baked. In addition, an alignment process is performed with, for example, a rubbing process, thereby completing the lower substrate 2. An insulating film may be formed in a gap between the alignment film and the transparent electrode, if necessary.

A peripheral seal material is printed on one of the upper substrate 1 and the lower substrate 2 by, for example, a print process. Then, pre-baking is performed to remove a solvent component in the seal material. After the upper substrate 1 and the lower substrate 2 have been aligned together, a liquid crystal material is injected into an inlet formed in the peripheral seal material, and then the inlet is sealed, thereby forming a liquid crystal layer 11. Instead of this dip method, the liquid crystal material may be injected by a dispenser method. Specifically, the liquid crystal layer 11 may be formed by forming a peripheral seal material having no inlet on one of the substrates, dropping a liquid crystal material in the frame of a peripheral seal pattern, and then aligning the substrates 1 and 2 together. Through the foregoing process, the liquid crystal panel 10A is obtained.

The liquid crystal panel 10A is formed without changing existing fabrication processes for a liquid crystal display apparatus at all because a parallax barrier pattern is formed by using photolithography that is generally used in processes for fabricating a liquid crystal display apparatus. Specifically, use of general photolithography for the light-transmitting resin layer 12 allows formation of a fine barrier pattern with accuracy in pattern size. In addition, even in a case where a fine parallax barrier is needed, a transparent electrode does not need to be patterned, so that no failures due to occurrence of breaks in wiring of the transparent electrode occur in switching between opaque and transmission.

As a parallax barrier pattern, a pattern such as a stripe barrier pattern, a matrix barrier pattern or an oblique barrier pattern having stepwise openings may be freely selected in accordance with the pixel pattern of the image display device 20. Since the barrier pattern is formed by photolithography, not only a linear shape but also a shape such as a curved shape can be freely selected for the pattern.

Example 1

For more specific description of the parallax barrier device according to the present invention, an example of the present invention will be described. A liquid crystal panel 10A serving as a parallax barrier device in this example was fabricated by the following process. First, a solution of a negative resist for a spacer ("JNPC-77" (product name) produced by JSR Corporation) was applied onto a substrate 2 of glass provided with ITO (not shown) with a spin coater at a rotation speed of 2000 rpm for one minute. Then, pre-baking was performed at 120° C. with a clean oven for 10 minutes, thereby removing a residual solvent in a spacer. Thereafter, light exposure was performed using a photo mask in such a manner as to form a desirable light-transmitting resin pattern for the liquid crystal panel 10A. This exposure was performed using ultraviolet rays with a light-exposure amount of 200 mJ. Thereafter, development was performed with a 2% NaOH aqueous solution for one minutes at 30° C., water rinsing was performed, and then baking was performed at 230° C. with a clean oven for 40 minutes.

Next, an alignment film made of polyamic acid was formed, and then was subjected to baking at 250° C. with a clean oven for 30 minutes. An alignment process was performed on the baked alignment film such that the alignment film has a desired alignment direction by rubbing, thereby obtaining a lower substrate 2. In the same manner, an upper substrate 1 was formed.

A peripheral seal material ("XN-21S" (product name) produced by Mitsui Chemicals, Inc.) was formed on the upper substrate 1 using a screen plate in which a seal shape in the shape of a frame was patterned. To remove a residual solvent in the seal material, heating was performed at 100° C. with a clean oven for 30 minutes. Then, the upper and lower substrates 1 and 2 were aligned together and baked at 200° C. for 60 minutes.

A liquid crystal material was injected into a gap between the aligned upper and lower substrates 1 and 2, thereby forming a liquid crystal layer 11 in a parallax barrier region 111. Then, a pair of polarizers 3 and 4 ("SEG1425DU" produced by NITTO DENKO CORPORATION) was bonded onto the upper and lower substrates 1 and 2, thereby obtaining a liquid crystal panel 10A for splitting polarized light of this example having a light shielding function.

An evaluation was conducted on influences of the width ratio between the barrier region 111 and the light-transmitting region 112 on a stereoscopic image display. Through the foregoing process, parallax barrier devices (liquid crystal panels 10A for splitting polarized light) having various ratios between the barrier-light-shielding-region width (Lb) and the light-transmitting-region width (La) were formed. The image display device 20 (liquid crystal display device) was placed at the rear of each parallax barrier device (i.e., placed at the side of the parallax barrier device opposite to a viewer), and it was estimated how a double image (crosstalk) of a stereoscopic image was seen. The results are shown in Table 1.

In this evaluation, a liquid crystal layer 11 exhibiting homogeneous alignment and containing a liquid crystal material whose dielectric-constant anisotropy was positive was used. This liquid crystal layer 11 has a retardation of $\lambda/2$ when no voltage is applied. The directions of the transmission axes of the respective polarizers 3 and 4 are set approximately in parallel with each other. In addition, the direction of alignment in the liquid crystal layer 11 is set at 45° with respect to the directions of the transmission axes of the polarizers 3 and 4.

TABLE 1

| | La:Lb | | | | |
|---|---|---|---|---|---|
| | 7:3 | 6:4 | 5:5 | 4:6 | 3:7 |
| crosstalk | NG | NG | G | EX | EX |

In Table 1, "EX" represents no crosstalk is observed, "G" represents a small amount of crosstalk is observed and "NG" represents crosstalk is clearly observed.

As shown in Table 1, if the width (Lb) of the barrier light-shielding region 111 is smaller than the width (La) of the light-transmitting region 112, a crosstalk characteristic is poor so that an excellent stereoscopic image is not obtained. Accordingly, to obtain an excellent stereoscopic image with no crosstalk, it is necessary to satisfy La≦Lb. The width (Lb) of the barrier light-shielding region 111 and the width (La) of the light-transmitting region 112 preferably satisfy the relationship of Lb:La=5:5 to 8:2. This is because if Lb is too much larger than La, the luminance in a stereoscopic image display decreases so that the resultant image becomes dark.

Next, the liquid crystal panels 10A described in the first through fourth embodiments were fabricated. The relationship among the alignment type of the liquid crystal layer 11, polarity of the dielectric-constant anisotropy of the liquid crystal layer, directions of the transmission axes of a pair of polarizers, the presence or absence of the $\lambda/2$ plate 5 and the contrast between the liquid crystal layer 11 (barrier light-shielding region) and the light-transmitting resin layer 12 during stereoscopic image display (i.e., the luminance of the light-transmitting resin layer 12/the luminance of the liquid crystal layer 11: referred to as "CR" in Table 2) was examined using these liquid crystal panels 10A. Table 2 shows the results.

In the case of using the $\lambda/2$ plate 5, the $\lambda/2$ plate 5 only needs to be placed between the upper substrate 1 and the polarizer 3 or between the lower substrate 2 and the polarizer 4. As the $\lambda/2$ plate 5, a two-dimensional retardation plate "NRF" made of polycarbonate and produced by NITTO DENKO CORPORATION was used. This $\lambda/2$ plate has a retardation of 260 nm. The width (Lb) of the barrier light-shielding region 111 and the width (La) of the light-transmitting region 112 were set as Lb:La=6:4.

The contrast between the light-transmitting resin layer 12 and the liquid crystal layer 11 (barrier light-shielding part) was measured using a BM5 (luminance calorimeter) produced by TOPCON CORPORATION. With respect to homogeneous alignment and TN alignment, measurement was performed under application of no voltage. With respect to homeotropic alignment, measurement was performed under application of a square wave of 200 Hz at 10 V.

TABLE 2

| Alignment mode | Dielectric-constant anisotropy of liquid crystal layer | Transmission axes of polarizers | Presence of $\lambda/2$ plate | CR |
|---|---|---|---|---|
| homogeneous | positive | parallel | no | 30 |
| homogeneous | positive | orthogonal | yes | >100 |
| homeotropic | negative | parallel | no | 25 |
| homeotropic | negative | orthogonal | yes | 80 |
| TN | positive | parallel | no | 50 |

Table 2 shows that an excellent contrast and an excellent parallax barrier characteristic were exhibited under every condition. In the homogeneous and homeotropic alignments, the transmission axes of the pair of polarizers are orthogonal to each other and, in addition, the $\lambda/2$ plate is used, so that a very high contrast is achieved. In the TN alignment, even when no $\lambda/2$ plate is used, a contrast higher than those in the homogeneous and homeotropic alignments is obtained. That is, an excellent three-dimensional image is obtained.

In a case where the directions of the transmission axes of the pair of polarizers are parallel to each other, a relatively low contrast is exhibited. However, a sufficient parallax barrier characteristic is exhibited and the $\lambda/2$ plate 5 is not needed, so that the cost can be reduced.

When a voltage was applied to parallax barrier devices exhibiting the homogeneous and TN alignments, respectively, the barrier light-shielding region 111 where the liquid crystal layer 11 was formed was in a bright state, so that a bright and excellent two-dimensional image display was observed. The transmittance of the liquid crystal layer 11 varies depending on a driving voltage. Accordingly, if the driving voltage is set high, a brighter two-dimensional image display is produced.

In the case of a parallax barrier device exhibiting the homeotropic alignment, when no voltage was applied to the parallax barrier device, the barrier light-shielding region 111 where the liquid crystal layer 11 was formed was in a bright state, so that a bright and excellent two-dimensional image display was observed.

In the cases of the homogeneous and TN alignments, a three-dimensional image is displayed under application of no voltage. Accordingly, if the device is applied to electronic equipment displaying three-dimensional images more frequently than two-dimensional images, power consumption can be reduced. On the other hand, in the case of the homeotropic alignment, a two-dimensional image is displayed under application of no voltage. Accordingly, if the device is applied to electronic equipment displaying two-dimensional images more frequently than three-dimensional images, power consumption can be reduced. Accordingly, the alignment mode is appropriately selected according to purposes of electronic equipment to which the device is to be applied, more specifically, according to whether three-dimensional images or two-dimensional images are mainly displayed, so that power consumption can be reduced.

Example 2

In the same manner as in example 1, upper and lower substrates 1 and 2 were formed. A nematic liquid crystal material ("ZLI2293" (product name) produced by Merck Ltd.) was injected into a gap between the aligned upper and lower substrates 1 and 2, thereby forming a TN liquid crystal layer 11 in a parallax barrier region 111. As in example 1, a pair of polarizers 3 and 4 was bonded onto the respective upper and lower substrates 1 and 2, thereby obtaining a liquid crystal panel 10A of this example for splitting polarized light having a light shielding function.

With respect to the liquid crystal panel 10A thus obtained, the transmittances of a light-transmitting resin layer 12 and the liquid crystal layer 11 (barrier light-shielding part) in displaying a three-dimensional image and a two-dimensional image were measured using a BM7 (luminance calorimeter) produced by TOPCON CORPORATION. In the three-dimensional image display (under application of no voltage), the transmittance of the light-transmitting resin layer 12 is 39.8% whereas the transmittance of the liquid crystal layer 11 (barrier light-shielding part) is less than 1%. This shows that the liquid crystal panel 10A functions as a light shield in the three-dimensional image display.

Next, in the two-dimensional image display (under application of a voltage), if the transmittance difference between the light-transmitting resin layer 12 and the liquid crystal layer 11 is large, a stripe pattern or the like is perceived in viewing a two-dimensional image, so that a uniform two-dimensional image is not obtained. Accordingly, the transmittances of the light-transmitting resin layer 12 and the liquid crystal layer 11 need to be equal to each other.

Irrespective of application/no application of a voltage, the transmittance of the light-transmitting resin layer 12 is constant at 40.1%. The transmittance of the liquid crystal layer 11 (barrier light-shielding part) depends on an applied voltage and increases as the applied voltage increases. When a square wave at 200 Hz is applied with a voltage of 5V, the liquid crystal panel 10A used in this example has a transmittance of 35.4% and the transmittance difference between the light-transmitting resin layer 12 and the liquid crystal layer is large, so that a pattern of the barrier light-shielding part is observed in eyes. However, when a square wave at 200 Hz is applied with a voltage of 7V, the transmittance of the liquid crystal layer 11 (barrier light-shielding part) is 41.1%, so that little transmittance difference exists. Accordingly, the pattern of the barrier light-shielding part is not observed in eyes, so that an image having excellent in-plane transmittance uniformity is obtained.

In this manner, to equalize the transmittances of the light-transmitting resin layer 12 and the liquid crystal layer 11 in displaying a two-dimensional image, an applied voltage is adjusted as described above, thereby adjustment for equalizing is easily performed.

In the parallax barrier device according to the present invention, a light-transmitting part filled with a resin having the property of transmitting light and a barrier light-shielding part filled with a liquid crystal material are provided between a pair of transparent-electrode substrates, thereby forming a parallax barrier. In this manner, a three-dimensional image utilizing binocular parallax is displayed. In addition, the liquid crystal layer is electrically switched, so that the entire region of the parallax barrier device is in the state of a bright display. For example, a bright display is produced by applying a voltage in the cases of homogeneous alignment and TN alignment and by applying no voltage in the case of homeotropic alignment. Accordingly, a stereoscopic image display apparatus is capable of producing a bright two-dimensional display. In addition, the parallax barrier device according to the present invention is a liquid crystal panel with a very simple structure and thus is easily fabricated.

A light-transmitting resin layer formed between the pair of transparent-electrode substrates of the parallax barrier device according to the present invention has a function of a spacer for maintaining a uniform space between the pair of transparent-electrode substrates. Accordingly, the whole light-transmitting part serves as a spacer and maintains a uniform space between the pair of transparent-electrode substrates. This is advantageous in terms of uniformity in in-plane cell thickness in a liquid crystal panel as a parallax barrier device.

The light-transmitting resin layer formed between the pair of transparent-electrode substrates of the liquid crystal panel as the parallax barrier device according to the present invention is formed by photolithography, which is frequently used in usual processes of fabricating liquid crystal display apparatuses, without change. Accordingly, new processes do not need to be introduced, so that a parallax barrier device is fabricated with size accuracy in barrier pattern by a very simple process.

In the liquid crystal panel as the parallax barrier device according to the present invention, transparent electrodes of the transparent-electrode substrates are not necessarily patterned. Accordingly, no wiring failures occur even in the case of forming a fine barrier pattern. As a result, the fabrication yield is enhanced.

In the case of fabricating a stereoscopic image display apparatus using the liquid crystal panel as the parallax barrier device according to the present invention, if alignment in the liquid crystal layer is homogeneous or TN alignment, a three-dimensional image is displayed under application of no voltage and a two-dimensional image is displayed under application of a voltage. If a $\lambda/2$ plate is additionally used, a better barrier performance is exhibited, so that an excellent three-dimensional image is obtained. On the other hand, if alignment in the liquid crystal layer is homeotropic alignment, a two-dimensional image is displayed under application of no voltage and a three-dimensional image is displayed under application of a voltage. If a $\lambda/2$ plate is additionally used, a better barrier performance is exhibited, so that an excellent three-dimensional image is obtained.

In the parallax barrier device according to the present invention, a fine barrier pattern is formed with accuracy in size by using conventional processes of fabricating a liquid crystal display apparatus. In addition, in the parallax barrier device according to the present invention, a barrier pattern is electrically switched between display and non-display. Accordingly, if the device is combined with an image display device including, for example, a left-eye pixel part and a right-eye pixel part, a stereoscopic image display apparatus which switches the display between a three-dimensional image and a two-dimensional image is obtained.

INDUSTRIAL APPLICABILITY

A parallax barrier device according to the present invention is applicable to a display apparatus displaying different images at the same time. For example, the parallax barrier device is applicable to a stereoscopic image display apparatus (three-dimensional display apparatus) utilizing binocular parallax or a display apparatus allowing viewers respectively at the left and right sides of a display screen to see different images. More specifically, the device is applicable to cellular phones, notebook computers, personal digital assistances (PDAs), displays for personal computers, liquid-crystal television sets, medical displays, displays for car navigation systems, amusement equipment including games and pinball machines (pachinko.)

The invention claimed is:

1. A parallax barrier device comprising a pair of transparent-electrode substrates each provided with a transparent electrode, and a pair of polarizers sandwiching the pair of transparent-electrode substrates therebetween,
wherein a barrier light-shielding part and a light-transmitting part are formed in a gap between the pair of transparent-electrode substrates,
a liquid crystal layer is formed in the barrier light-shielding part,
a resin layer having the property of transmitting light and not serving as a liquid crystal layer is formed in the light transmitting part,
the barrier light-shielding part and the light-transmitting part are alternately arranged along a direction in a plane parallel to the pair of transparent-electrode substrates;
the directions of transmission easy axes of the pair of polarizers are approximately parallel to each other, and
the barrier light-shielding part is configured to change a polarization state of light entering the liquid crystal layer according to a distribution state of liquid crystal molecules so that a polarization state of light which has passed through the liquid crystal layer differs from a polarization state of light which has passed through the resin layer having the property of transmitting light.

2. The parallax barrier device of claim 1, wherein
the width of the barrier light-shielding part in the direction in the plane is larger than or equal to the width of the light-transmitting part in the direction in the plane.

3. The parallax barrier device of claim 1, wherein the liquid crystal layer is a liquid crystal layer exhibiting homogeneous alignment and containing a liquid crystal material whose dielectric-constant anisotropy is positive, and
the liquid crystal layer has a retardation of ½ of the wavelength of light entering the liquid crystal layer under application of no voltage.

4. The parallax barrier device of claim 1, wherein the liquid crystal layer is a liquid crystal layer exhibiting homeotropic alignment and containing a liquid crystal material whose dielectric-constant anisotropy is negative, and
the liquid crystal layer has a retardation of ½ of the wavelength of light entering the liquid crystal layer under application of a voltage.

5. The parallax barrier device of claim 1, wherein the liquid crystal layer is a liquid crystal layer exhibiting twisted nematic alignment.

6. The parallax barrier device of claim 1, wherein the transparent electrode provided in each of the pair of transparent-electrode substrates is a common electrode.

7. The parallax barrier device of claim 1, wherein the resin layer having the property of transmitting light also functions as a spacer for maintaining a uniform space between the pair of transparent-electrode substrates.

8. A method for fabricating the parallax barrier device of claim 1, the method comprising the steps of:
applying a resin material having an approximately isotropic refractive index and having the property of transmitting light onto the transparent-electrode substrates; and
performing, on the resin material, processes of light exposure using a photo mask, development and baking, thereby forming the resin layer.

9. A display apparatus comprising:
the parallax barrier device of claim 1; and
an image display device including a first pixel part constituting a first image and a second pixel part constituting a second image.

10. The display apparatus of claim 9, wherein the first pixel part is a pixel part for a left eye, and
the second pixel part is a pixel part for a right eye.

11. The display apparatus of claim 9, further comprising a light source placed at a larger distance from a viewer than those from the parallax barrier device and the image display device.

12. The display apparatus of claim 9, wherein the liquid crystal layer switches display between a first display and a second display by switching the state of light between opaque and transmission in accordance with an electric signal applied to the pair of transparent-electrode substrates.

13. The display apparatus of claim 10, wherein the liquid crystal layer switches display between a stereoscopic display and a plane display by switching the state of light between opaque and transmission in accordance with an electric signal applied to the pair of transparent-electrode substrates.

14. A parallax barrier device comprising a pair of transparent-electrode substrates each provided with a transparent electrode and a pair of polarizers sandwiching the pair of transparent-electrode substrates therebetween,
wherein a barrier light-shielding part and a light-transmitting part are formed in a gap between the pair of transparent-electrode substrates,
a liquid crystal layer is formed in the barrier light-shielding part,
a resin layer having the property of transmitting light and not serving as a liquid crystal layer is formed in the light-transmitting part,
the barrier light-shielding part and the light-transmitting part are alternately arranged along a direction in a plane parallel to the pair of transparent-electrode substrates, and
the barrier light-shielding part is configured to change a polarization state of light entering the liquid crystal layer according to a distribution state of liquid crystal molecules so that a polarization state of light which has passed through the liquid crystal layer differs from a polarization state of light which has passed through the resin layer having the property of transmitting light.

15. The parallax barrier device of claim 1, wherein the resin layer is a negative resist for a spacer.

16. The parallax barrier device of claim 9, wherein the resin layer is a negative resist for a spacer.

17. The parallax barrier device of claim 9, wherein the first image and the second image incident on the light-transmitting part are separated from each other.

* * * * *